United States Patent
Alcorn et al.

(10) Patent No.: US 9,538,299 B2
(45) Date of Patent: Jan. 3, 2017

(54) ACOUSTIC ECHO CANCELLATION (AEC) WITH CONFERENCING ENVIRONMENT TEMPLATES (CETS)

(75) Inventors: Byron A. Alcorn, Fort Collins, CO (US); Majid Fozunbal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1844 days.

(21) Appl. No.: 12/606,930

(22) Filed: Oct. 27, 2009

(65) Prior Publication Data

US 2011/0099485 A1 Apr. 28, 2011

(51) Int. Cl.
*H04R 27/00* (2006.01)
*H04M 9/08* (2006.01)

(52) U.S. Cl.
CPC ............ *H04R 27/00* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 5,323,459 A * | 6/1994 | Hirano | 379/391 |
| 5,619,555 A | 4/1997 | Fenton et al. | |
| 5,634,016 A * | 5/1997 | Steadham et al. | 715/753 |
| 5,913,062 A * | 6/1999 | Vrvilo et al. | 719/321 |
| 6,195,091 B1 | 2/2001 | Harple et al. | |
| 6,590,603 B2 | 7/2003 | Sheldon et al. | |
| 7,194,761 B1 | 3/2007 | Champagne | |
| 7,298,834 B1 | 11/2007 | Homeier et al. | |
| 7,870,199 B2 | 1/2011 | Galli et al. | |
| 7,900,140 B2 | 3/2011 | Mohammed et al. | |
| 2003/0020036 A1 | 1/2003 | Heun et al. | |
| 2003/0200336 A1 | 10/2003 | Pal et al. | |
| 2003/0224780 A1 | 12/2003 | Rodman et al. | |
| 2004/0179092 A1 | 9/2004 | LaPoint | |
| 2004/0196315 A1 | 10/2004 | Swearingen et al. | |
| 2005/0004982 A1 | 1/2005 | Vernon et al. | |
| 2005/0007965 A1 | 1/2005 | Hagen et al. | |
| 2005/0010673 A1 | 1/2005 | Satuloori et al. | |
| 2005/0114784 A1 | 5/2005 | Spring et al. | |
| 2005/0204289 A1 | 9/2005 | Mohammed et al. | |
| 2005/0262201 A1 * | 11/2005 | Rudolph et al. | 709/205 |
| 2005/0262254 A1 | 11/2005 | Sherwani | |
| 2006/0053380 A1 * | 3/2006 | Spataro et al. | 715/753 |

(Continued)

OTHER PUBLICATIONS

Dialogic Application Note, "Media Server Solution Recipe: Conferencing Applications," Copyright 2007 Dialogic Corporation Jun. 2007 8708-02, 14 pp. [Online] http://www.dialogic.com/products/applnote.htm.

*Primary Examiner* — Anil N Kumar
(74) *Attorney, Agent, or Firm* — HP Inc. Patent Department (57) ABSTRACT

In at least some embodiments, a computer system includes a processor and a network interface coupled to the processor. The computer system also includes a system memory coupled to the processor, the system memory storing a communication application having a conferencing user interface. The conferencing user interface, when executed, enables a user to set up a conferencing session by selecting one of a plurality of conferencing environment templates (CETs). Each CET is matched to one of a plurality of different sets of acoustic echo cancellation (AEC) parameters to be applied during the conferencing session.

20 Claims, 4 Drawing Sheets

(56) References Cited

U.S. PATENT DOCUMENTS

| | | |
|---|---|---|
| 2006/0088173 A1* | 4/2006 | Rodman et al. ................ 381/92 |
| 2006/0165020 A1* | 7/2006 | Schultz ........................ 370/286 |
| 2006/0253888 A1 | 11/2006 | Senga et al. |
| 2007/0016680 A1 | 1/2007 | Burd et al. |
| 2007/0126859 A1 | 6/2007 | Choi et al. |
| 2007/0133437 A1 | 6/2007 | Wengrovitz et al. |
| 2007/0250582 A1 | 10/2007 | Sidhu et al. |
| 2007/0253565 A1 | 11/2007 | Fozunbal |
| 2008/0025278 A1 | 1/2008 | Hoecker et al. |
| 2008/0040443 A1 | 2/2008 | Agrawal |
| 2008/0107281 A1* | 5/2008 | Togami et al. ................ 381/66 |
| 2008/0159272 A1 | 7/2008 | McClung et al. |
| 2009/0210491 A1 | 8/2009 | Thakkar et al. |
| 2009/0217359 A1 | 8/2009 | Kikkawa et al. |
| 2011/0096699 A1 | 4/2011 | Sakhamuri et al. |

* cited by examiner

ACOUSTIC ECHO CANCELLATION (AEC) WITH CONFERENCING ENVIRONMENT TEMPLATES (CETS)

CROSS-REFERENCE TO RELATED APPLICATIONS

The present application may be related to each of the following applications: U.S. application Ser. No. 12/551,273, filed Aug. 31, 2009, and entitled "COMMUNICATION APPLICATION"; U.S. application Ser. No. 12/606,894, filed Oct. 27, 2009, and entitled "MEDIA PIPELINE FOR A CONFERENCING SESSION"; and U.S. application Ser. No. 12/606,940, filed Oct. 27, 2009, and entitled "COMMUNICATION APPLICATION WITH STEADY-STATE CONFERENCING", all hereby incorporated herein by reference in their entirety.

BACKGROUND

Acoustic echo cancellation (AEC) techniques need to perform two functions: echo detection and echo cancellation. Implementation of AEC is not a trivial task and many AEC techniques have reduced effect due to overly simplistic algorithms and/or improper use of AEC parameters.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to techniques for remote conferencing via at least one intermediary network. In accordance with embodiments, a communication application provides an acoustic echo cancellation (AEC) feature during a conferencing session via the intermediary network. As an example, the AEC feature may be part of a media pipeline associated with the communication application and is an integral part of audio communications. As used herein, "media pipeline" refers to software components that transform media from one form to another. For example, in addition to providing the disclosed AEC feature, a media pipeline may compress and mix media to be transmitted, format media for transmission via a network, recover media received via a network, unmix received media, and decompress received media. Such a media pipeline comprises software components executed by a media transmitting device and a media receiving device.

In accordance with at least some embodiments, the disclosed AEC feature is associated with a user interface that enables a user to select between a plurality of conferencing environment templates (CETs) for use with AEC. Each CET corresponds to a set of AEC parameters, referred to herein as CET parameters. The value of at least some CET parameters varies for each of the plurality of CETs. The disclosed AEC feature also may have other AEC parameters that are not affected by CET selection. In some embodiments, a user is presented with a simplified interface that facilitates CET selection without user knowledge of the underlying CET parameters associated with each CET.

Figure 1:
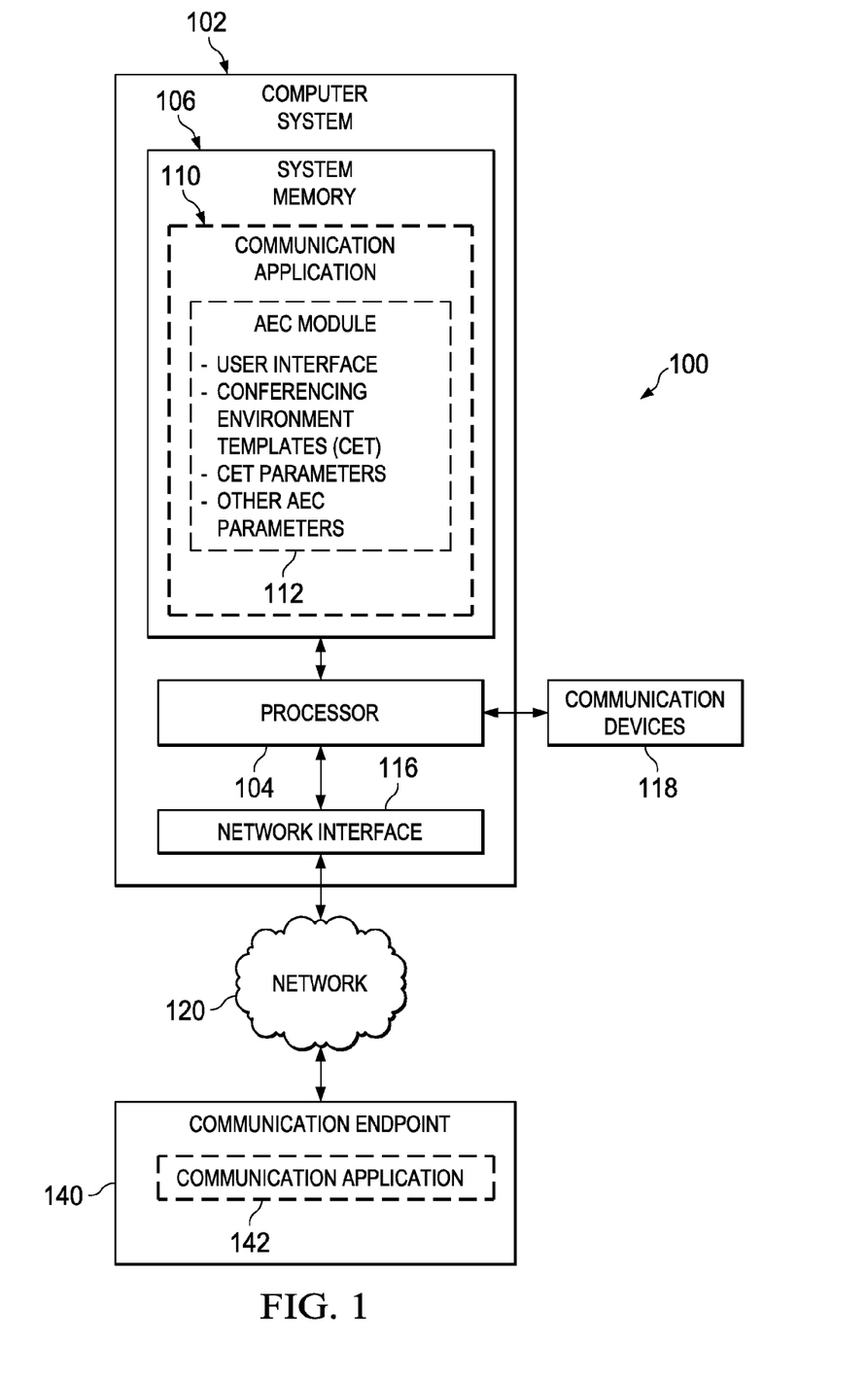
FIG. 1 illustrates a system in accordance with embodiments of the disclosure.

FIG. 1 illustrates a system 100 in accordance with embodiments of the disclosure. As shown in FIG. 1, the system 100 comprises a computer system 102 coupled to a communication endpoint 140 via a network 120. The computer system 102 is representative of a desktop computer, a laptop computer, a "netbook," a smart phone, a personal digital assistant (PDA), or other electronic devices. Although only one communication endpoint 140 is shown, it should be understood that the computer system 102 may be coupled to a plurality of communication endpoints via the network 120. Further, it should be understood, that the computer system 102 is itself a communication endpoint. As used herein, a "communication endpoint" refers to an electronic device that is capable of running a communication application and supporting a remote conferencing session.

In accordance with embodiments, the computer system 102 and communication endpoints (e.g., the communication endpoint 140) employ respective communication applications 110 and 142 to facilitate efficient remote conferencing sessions. As shown, the communication application 110 comprises an AEC module 112. Although not required, the communication application 142 may comprise the same module(s) as the communication application 110. Various operations related to the AEC module 112 will later be described.

As shown in FIG. 1, the computer system 102 comprises a processor 104 coupled to a system memory 106 that stores the communication application 110. In accordance with embodiments, the processor 104 may correspond to at least one of a variety of semiconductor devices such as microprocessors, central processing units (CPUs), microcontrollers, main processing units (MPUs), digital signal processors (DSPs), advanced reduced instruction set computing (RISC) machines, ARM processors, application specific integrated circuits (ASICs), field programmable gate arrays (FPGAs) or other processing devices. In operation, the processor 104 performs a set of predetermined functions based on data/instructions stored in or accessible to the processor 104. In at least some embodiments, the processor 104 accesses the system memory 106 to obtain data/instructions for the predetermined operations. The system memory 106 is sometimes referred to as a computer-readable storage medium and may comprise volatile memory (e.g., Random Access Memory), non-volatile memory (e.g., a hard drive, a flash drive, an optical disk storage, etc.), or both.

To support a remote conferencing session, the computer system 102 comprises communication devices 118 coupled to the processor 104. The communication devices may be built-in devices and/or peripheral devices of the computer system 102. As an example, the communication devices 118 may correspond to various input devices and/or output devices such as a microphone, a video camera (e.g., a web-cam), speakers, a video monitor (e.g., a liquid crystal display), a keyboard, a keypad, a mouse, or other devices that provide a user interface for communications. Each communication endpoint (e.g., the communication endpoint 140) also may include such communication devices.

To enable remote conferencing sessions with communication endpoints coupled to the network 120, the computer system 102 further comprises a network interface 116 coupled to the processor 104. The network interface 116 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces. In conjunction with execution of the communication application 110 by the processor 104, the network interface 116 enables initiation and maintenance of a remote conferencing session between the computer system 102 and a communication endpoint.

In accordance with at least some embodiments, execution of the AEC module 112 (e.g., by the processor 104) enables various AEC features for use with a conferencing session. As shown, the AEC module 112 provides a user interface, CETs, CET parameters, and other AEC parameters.

The user interface enables a conference participant to provide input regarding the conferencing environment (e.g., room size, room shape, speaker location, microphone location) and/or to select from a plurality of predetermined conferencing environments. The conferencing environment user input causes the AEC module 112 to select a CET that matches (or most closely matches) the conferencing environment indicated by the user. The CET parameters corresponding to the selected CET will be applied during the conferencing session (e.g., by the media pipeline for the conferencing session). The AEC module 112 also may implement other AEC parameters that are not affected by CET selection. Such AEC parameters may include, but are not limited to, gain controls, DC removal, spectral estimation, and functions attributed to intrinsic properties of audio signals.

In some embodiments, predetermined conferencing environments are visible by a conference participant. For example, the predetermined conferencing environments may be labeled as "office", "conference room", and "auditorium". Further, a user may designate an "office", "conference room", or "auditorium" selection as "small" or "large". In alternative embodiments, a user is able to enter conferencing environment information (e.g., room size, room shape, speaker location, and microphone location) that leads to automated selection of a matching CET or closest CET match. Further, in some embodiments, CET parameters corresponding to different CETs are visible to a conference participant. Alternatively, CET parameters are not visible to a conference participant, but are visible to a conference administrator. Similarly, in some embodiments, other AEC parameters are visible to a conference participant. Alternatively, the other AEC parameters are not visible to a conference participant, but are visible to a conference administrator.

In accordance with at least some embodiments, the CETs comprise an office room template, a conference room template, and an auditorium template. The CET parameters corresponding to the office room template, the conference room template, and the auditorium template vary. Such CET parameters may include, but are not limited to, estimation filter size parameters, the rate of adaptation, regularization parameters, sensitivity to double-talk parameters, noise level estimates, and overall parameters that control adaptation behavior. As an example, the rate of adaptation parameter value for a large reverberant room may be two or three times the rate of adaptation parameter value for an acoustically treated room.

In at least some embodiments, the plurality of CETs are categorized by room size. Additionally or alternatively, the plurality of CETs are categorized by room shape. Additionally or alternatively, the plurality of CETs are categorized by speaker location and microphone location within a room. Thus, by enabling a user to provide information regarding room size, room shape, speaker location, microphone location and/or other relevant parameters, an appropriate CET may be selected.

In some embodiments, AEC parameters associated with the AEC module 112 may comprise a suppression method parameter (e.g., "Suppression_Method"), a suppression level parameter (e.g., "Suppression_Level"), a rate of adaptation parameter (e.g., "samplingRate"), estimation filter size parameters (e.g., "AEC_Len", "ASIO_data_size", and "history_win_size"), regularization parameters, sensitivity to double-talk parameters (e.g., "slide_win_size", "BLK_Num_Decision", and "delay block"), noise level estimates, and overall parameters that control adaptation behavior.

In accordance with at least some embodiments, the communication application 110 establishes a peer-to-peer conferencing session between the computer system 102 and a communication endpoint based on "gateway remoting". As used herein, "gateway remoting" refers to a technique of indirectly populating a contact list of potential conference clients for the communication application 110 and maintaining presence information for these potential conference clients using predetermined contact list and presence information maintained by at least one gateway server.

In order to access a contact list and presence information maintained by a given gateway server, a user at the computer system 102 often logs into the communication service provided by the given gateway server. Although the user could log into each gateway server communication service separately, some embodiments of the communication application 110 enable management of the login process for all gateway service accounts associated with the user of the computer system 102. For example, when a user successfully logs into the communication application 110, all gateway server accounts associated with the user are automatically activated (e.g., by completing a login process for each gateway server account). Additionally or alternatively, contact list information and presence information may be entered manually by via a local gateway connection.

To initiate a remote conferencing session, a user at the computer system 102 selects a conference client from the populated contact list of the communication application 110. The communication application 110 then causes an initial request to be sent to the selected conference client via an appropriate gateway server communication service provided by at least one gateway server. In some cases, there may be more than one appropriate gateway server communication service since the user of the computer system 102 and the selected conference client may be logged into multiple gateway server accounts at the same time. Regardless of the number of appropriate gateway server communication services, the computer system 102 does not yet have direct access to the communication endpoint associated with the selected conference client. After indirectly exchanging connection information (e.g., IP addresses and user names associated with the communication application 110) via a gateway server communication service (e.g., Gmail®, Jabber®, and Office Communicator®), the computer system 102 and the appropriate communication endpoint are able to establish a peer-to-peer conferencing session without further reliance on a gateway server or gateway server communication service. For more information regarding gateway remoting, reference may be had to U.S. application Ser. No. 12/551,273, filed Aug. 31, 2009, and entitled "COMMUNICATION APPLICATION", which is hereby incorporated herein by reference.

Figure 2:
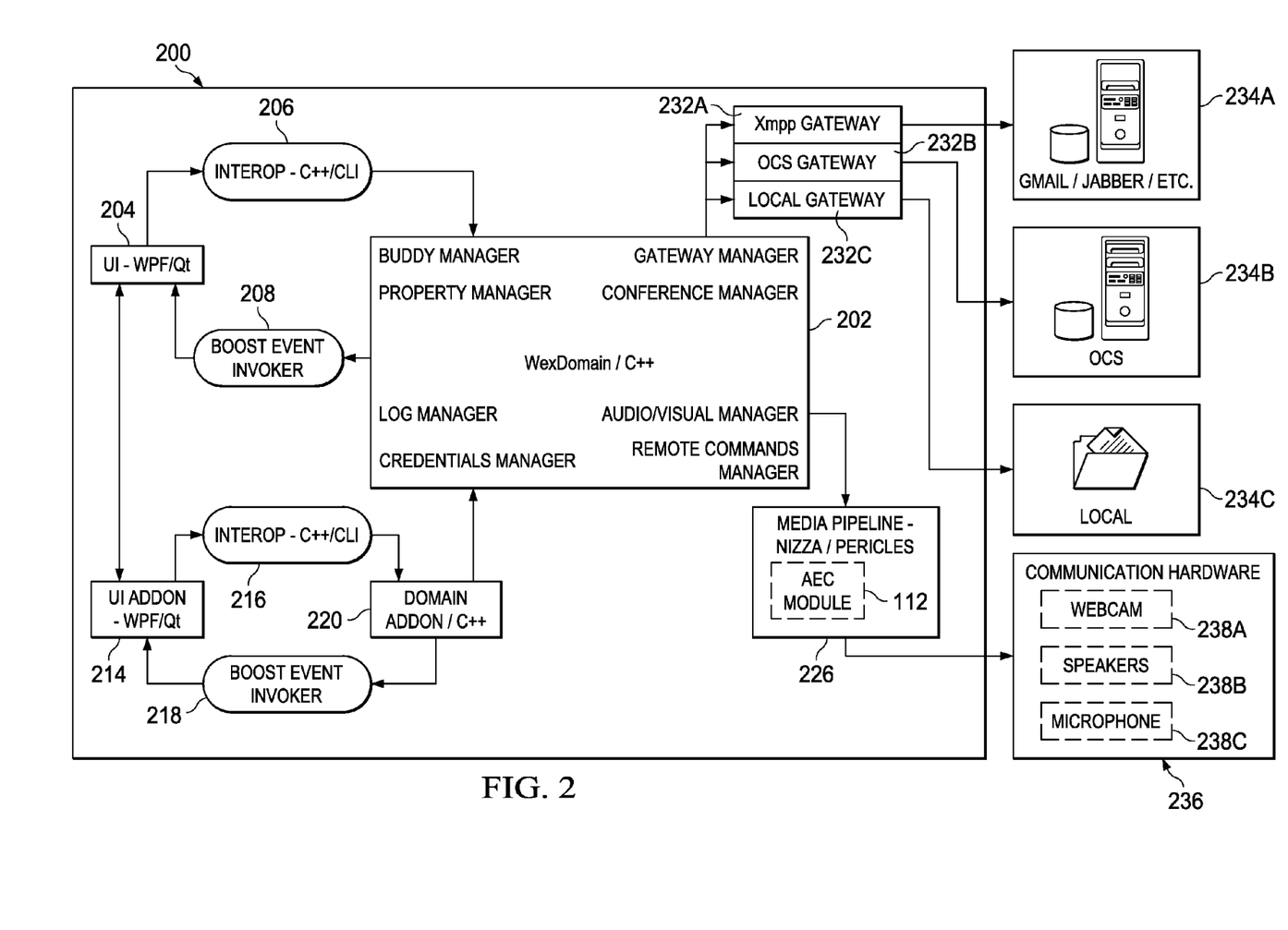
FIG. 2 illustrates various software components of a communication application in accordance with an embodiment of the disclosure.

FIG. 2 illustrates various software components of a communication application 200 in accordance with an embodiment of the disclosure. The communication application 200 may correspond, for example, to either of the communication applications 110 and 142 of FIG. 1. As shown, the communication application 200 comprises a management module 202 that supports various management functions of the communication application 200. As shown, the management module 202 supports a "Buddy Manager", a "Property Manager", a "Log Manager", a "Credentials Manager", a "Gateway Manager", a "Conference Manager", an "Audio/Video (A/V) Manager", and a "Remote Command Manager."

The Buddy Manager of the management module 202 maintains a contact list for the communication application 200. The Property Manager of the management module 202 enables administrative modification of various internal properties of the communication application 200 such as communication bandwidth or other properties. The Gateway Manager of the management module 202 provides an interface for the communication application 200 to communicate with gateway servers 254A-254C. As shown, there may be individual interfaces 232A-232C corresponding to different gateway servers 254A-254C since each gateway server may implement a different protocol. Examples of the interfaces 232A-232C include, but are not limited to, an XMPP interface, an OCS interface, and a local interface.

Meanwhile, the Conference Manager of the management module 202 handles communication session features such as session initiation, time-outs, or other features. The Log Manager of the management module 202 is a debug feature for the communication application. The Credentials Manager of the management module 202 handles login information (e.g., username, password) related to the gateway servers 254A-254C so that an automated login process to the gateway servers 254A-254C is provided by the communication application 200. The NV Manager of the management module 202 sets up an A/V pipeline to support the communication session. The Remote Commands Manager of the management module 202 provides remoting commands that enable the communication endpoint (e.g., the computer system 102) that implements the communication application 200 to send information to and receive information from a remote computer.

As shown, the management module 202 interacts with various other software modules. In at least some embodiments, the management module 202 sends information to and receives information from a user interface (UI) module 204. The UI module 204 may be based on, for example, Windows Presentation Foundation (WPF) or "Qt" software. In the embodiment of FIG. 2, the management module 202 sends information to the UI module 204 using a "boost" event invoker 208. As used herein, "boost" refers to a set of C++ libraries that can be used in code. On the other hand, the UI module 204 sends information to the management module 202 using a C++ interop (e.g., a Common Language Infrastructure (CLI) interop). To carry out the communication session, the management module 202 interacts with a media pipeline module 226. In at least some embodiments, the media pipeline module 226 comprises the AEC module 112 of FIG. 1 to provide some or all of the features described for the AEC module 112 (e.g., the user interface, CETs, CET parameters, and other AEC parameters). In operation, the media pipeline module 226 discovers, configures (e.g., codec parameters), and sends information to or receives information from communication hardware 236. Examples of communication hardware 236, include but are not limited to, web-cams 238A, speakers 238B and microphones 238C.

In the embodiment of FIG. 2, the UI module 204 and the management module 202 selectively interact with a UI add-on module 214 and a domain add-on module 220. In accordance with at least some embodiments, the "add-on" modules (214 and 220) extend the features of the communication application 200 for remote use without changing the core code. As an example, the add-on modules 214 and 220 may correspond to a "desktop sharing" feature that provides the functionality of the communication application 200 at a remote computer. More specifically, the UI add-on module 214 provides some or all of the functions of the UI module 204 for use by a remote computer. Meanwhile, the domain add-on module 220 provides some or all of the functions of the management module 202 for use by a remote computer.

Each of the communication applications described herein (e.g., communication applications 110, 142, 200) may correspond to an application that is stored on a computer-readable medium for execution by a processor. When executed by a processor, a communication application causes a processor to select one of a plurality of CETs based on user input and provide a conferencing session based on AEC parameters corresponding to the selected CET. A communication application, when executed, may further cause a processor to select between an office room CET, a conference room CET, and an auditorium CET based on user input. A communication application, when executed, may further cause a processor to select one of the plurality of CETs based on room size input, room shape input, speaker location input, and microphone location input. A communication application, when executed, may further cause a processor to implement AEC based on parameters such as a suppression method parameter, a suppression level parameter, a rate of adaptation parameter, estimation filter size parameters, regularization parameters, sensitivity to double-talk parameters, noise level estimates, and overall parameters that control adaptation behavior. More specifically, a communication application, when executed, may further cause a processor to implement AEC based on an echo suppression method parameter and an echo suppression level parameter that selectively vary for different CETs. Additionally or alternatively, a communication application, when executed, may further cause a processor to implement AEC based on an estimation filter size parameter, an adaptation rate parameter, and a double-talk sensitivity parameter that selectively vary for different CETs.

Figure 3:
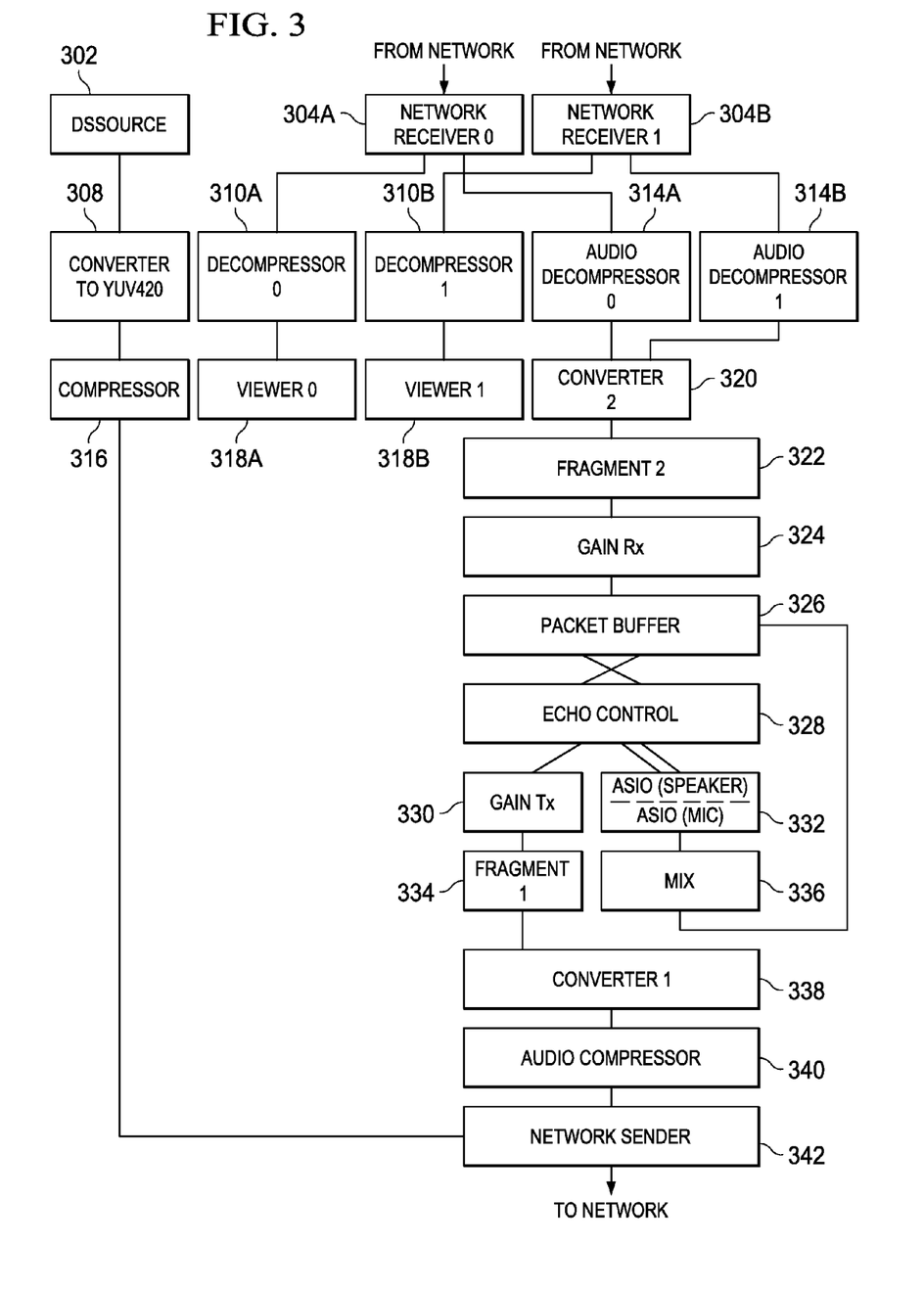
FIG. 3 illustrates components of a media pipeline in accordance with an embodiment of the disclosure.

FIG. 3 illustrates components of a media pipeline 300 in accordance with an embodiment of the disclosure. The media pipeline 300 is abstracted by software (e.g., Nizza software) as tasks that are connected together. In accordance with at least some embodiments, at least some of the disclosed AEC features are part of a media pipeline such as media pipeline 300. As shown, the media pipeline 300 comprises a "DS Source" block 302 connected to a converter block 308. The DS Source block 302 represents a digital media source (e.g., a web-cam) and the converter block 308 converts the digital media (e.g., video data) from the digital media source 302 from one format to another. As an example, the converter block 308 may change the color space of video data from a RGB pixel format to YUV format. The converted video data from the converter block 308 is provided to a compressor block 316 to compress the converted video data. The converted/compressed video data (CCVD) is then sent to a network sender block 342, which prepares the CCVD for transmission via a network. The network sender block 342 also receives converted/compressed audio data (CCAD) for transmission via a network. The audio data stream initiates at the Audio Stream Input/Output (ASIO) block 332, which handles data received from one or more microphones. The ASIO block 332 forwards microphone data to mix block 336, which adjusts the audio gain. The output of the mix block 336 is received by packet buffer 326 to control the rate of data (providing a latency guarantee). An echo control block 328 receives the output of the packet buffer 326 and performs echo cancellation on the audio data. In accordance with at least some embodiments, the operation of echo control block 328 is based on a user interface, CET selection, CET parameters, and other AEC parameters as disclosed herein.

The output of the echo control block 328 is then provided to transmitter gain block 330 to selectively adjust the audio transmission gain. The audio data from the transmitter gain block 330 becomes CCAD by the operation of a fragment 1 block 334, a converter 1 block 338, and an audio compressor block 340. As previously mentioned, the CCVD and CCAD are received by network sender block 342 for transmission via a network.

In FIG. 3, two participants receive the CCVD and CCAD from the network sender block 342. Alternatively, there could be more or less than two participants. With two participants, network receiver blocks 304A and 304B receive the CCVD and CCAD from the network. The CCVD is passed to decompressor blocks 310A and 310B, which provides decompressed video for presentation by viewer blocks 318A and 318B. Meanwhile, the CCAD received by the network receiver blocks 304A and 304B is provided to audio decompressors 314A and 314B. The decompressed audio from decompressors 314A and 314B is converted to another format by converter 2 block 320, then is fragmented by fragment 2 block 322. The output of the converter 2 block 320 is provided to receiver gain block 324 to selectively adjust the receiver gain of the audio data. The output of the receiver gain block 324 is handled by packet buffer 326 to control the rate of data (providing a latency guarantee) related to the ASIO block 332. The echo control block 328 receives audio data from the packet buffer 326 and provides AEC as disclosed herein. The output of the echo control block 328 is provided to the ASIO block 332 for presentation by speakers (e.g., left and right speakers).

Figure 4:
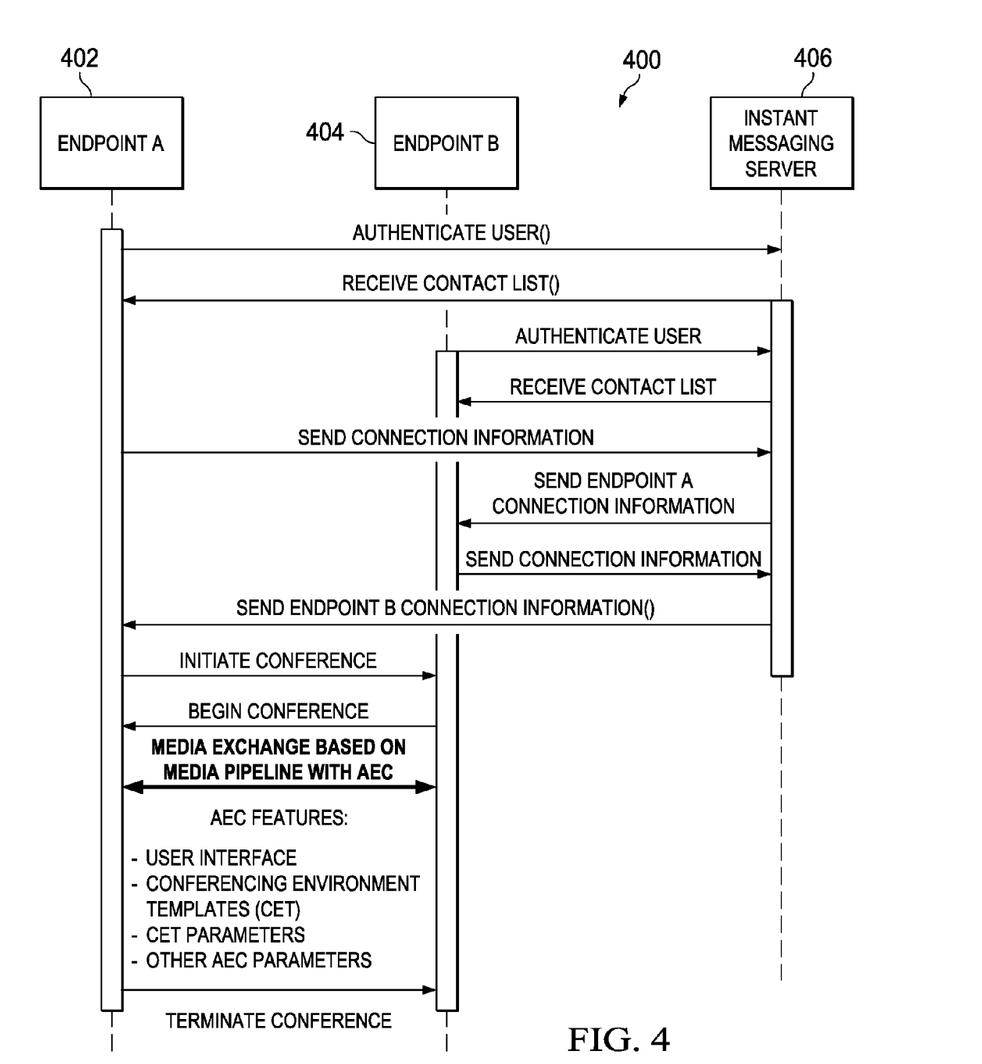
FIG. 4 illustrates a conferencing technique in accordance with an embodiment of the disclosure.

FIG. 4 illustrates a conferencing technique 400 in accordance with an embodiment of the disclosure. In FIG. 4, the steps begin chronologically at the top (nearest the blocks representing endpoints 402, 404 and instant messaging (IM) server 406) and proceed downward. As shown, the IM server 406 authenticates a user of the endpoint A 402. In response, the endpoint A 402 receives a contact list from the IM server 406. Next, the IM server 406 authenticates a user of the endpoint B 404. In response, the endpoint B 404 receives a contact list from the IM server 406. Based on the contact list from the IM server 406, endpoint A 402 sends connection information to the IM server 406, which forwards endpoint A connection information to the endpoint B 404. Similarly, endpoint B 404 sends connection information to the IM server 406, which forwards endpoint B connection information to the endpoint A 402. In other words, the endpoint A 402 and the endpoint B 404 exchange primary connection information via the IM server 406. Subsequently, the endpoint A 402 is able to initiate a conference with endpoint B 404 based on a media pipeline having the disclosed AEC features. After initiation of a conferencing session (e.g., a user of endpoint B 804 accepts a request to participate in a remote conferencing session with a user of endpoint A 802), a media exchange occurs. In accordance with at least some embodiments, AEC is applied during the media exchange based on a user-selected CET with corresponding CET parameters and/or other AEC parameters. Eventually, the conference terminates.

Figure 5:
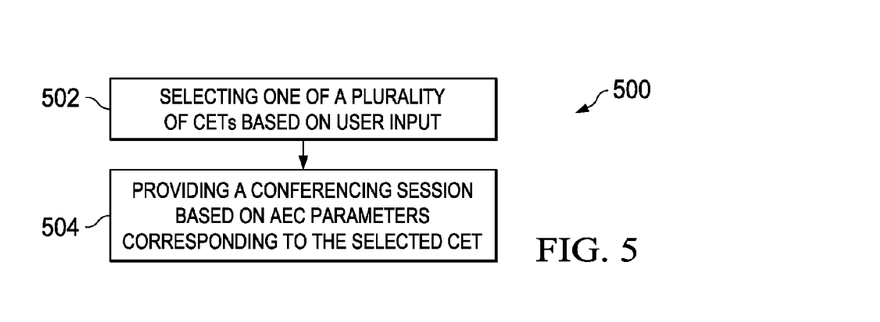
FIG. 5 illustrates a method in accordance with embodiments of the disclosure.

FIG. 5 illustrates a method 500 in accordance with embodiments of the disclosure. As shown, the method 500 comprises selecting one of a plurality of CETs based on user input (block 502). In some embodiments, selecting one of the plurality of CETs based on user input comprises selecting between an office room template, a conference room template, and an auditorium template based on user input. Additionally or alternatively, selecting one of the plurality of conferencing environment templates based on user input comprises selecting a template based on room size input, room shape input, speaker location input, and microphone location input. The method 500 further comprises providing a conferencing session based on acoustic echo cancellation (AEC) parameters corresponding to the selected conferencing environment template (block 504).

The method 500 may comprise additional steps that are added individually or in combination. As an example, the method 500 may additionally comprise selectively varying an AEC suppression technique parameter and an AEC suppression level parameter based on CET selection. The method 500 may additionally comprise selectively varying an AEC estimation filter size parameter, an AEC adaptation rate parameter, and an AEC double-talk sensitivity parameter based on CET selection. The method 500 may additionally comprise preventing at least some AEC parameters associated with the CETs from being viewed by conference participants.

In conclusion, another exemplary embodiment of the disclosed AEC feature is described herein without limitation to other embodiments. The disclosed AEC solution is part of conferencing software referred herein as "Overture". In the Overture embodiment, AEC can be very efficient if some of the characteristics of the environment are known. Environment characteristics that are relevant to Overture-based AEC include, but are not limited to, the size and shape of the room, background noise level, linearity of the audio input and output devices, volume levels, placement of people, placement of audio input devices, placement of audio output devices, reflectivity of items in the room, and the capabilities of the AEC algorithm. For different CETs at least some of these variables should be adjusted to provide effective AEC.

In accordance with the Overture embodiment, approximately 35-40 parameters are defined in relation to AEC operations. The Overture parameters determine how the AEC responds to the environment it is attempting to sample. Although the Overture parameters can be tuned such that AEC works extremely well in one environment, the same tuning is ineffective for other environments. So in accordance with embodiments, varied tuning of Overture AEC parameters is accomplished by establishing a plurality of CETs corresponding to tuned Overture AEC parameters and enabling CET selection based on user input.

For example, the user input may enable selection of CETs corresponding to a cubical, an office, a conference room, or an auditorium. The Overture AEC parameters can be easily tuned for each environment. For example, for a cubical environment, Overture AEC parameters may be tuned for a static place with quick return paths. In other words, the cubicle environment template assumes only a couple of users positioned close to the microphone and speakers. Alternatively, an auditorium template may tune Overture AEC parameters for a large room with longer return paths, numerous audience members but few close to the speakers or microphone. Further, the auditorium template may tune Overture AEC parameters for a microphone that moves (i.e., the Overture AEC parameters should allow for quick decision making and adjustment to prevent feedback due to a mobile microphone).

The Overture software may provide an audio adjustment panel in both the First-Use-Wizard (FUW) and the settings. Within this panel a user can define a small set of audio properties. One of these properties is the room characteristic. When set, the room characteristic property causes the Overture conferencing subsystem to substitute default or generic AEC parameters with specific AEC parameters corresponding to the selected room characteristic. It should be noted that not all 35-40 parameters need to be specified for each environment. If a given parameter does not exist for the room type specified, the parameter is assigned a default or generic room value. In at least some embodiments, the settings panel may comprise a dropdown box that will allow a user to select a room type. Selecting a room type will then set AEC parameters for the conferencing subsystem.

Provided herein is a compilation of various Overture parameters related to controlling audio transmitted via a media pipeline. For each media pipeline parameter, various parameter characteristics are determined such as: "parameter required during conferencing" (characteristic "C1"), "debug only" (characteristic "C2"), "initialized by property default" (characteristic "C3"), "visible in property file" (characteristic "C4"), "negotiated during initialization with conference participant" (characteristic "C5"), "negotiated during initialization of HW" (characteristic "C6"), "visible in the user interface" (characteristic "C7"), "default value" (characteristic "C8"), and "system dependent" (characteristic "C9"). Table 1 shows a listing of Overture parameters and relevant characteristics. In Table 1: "Y" refers to "yes"; "N" refers to "no"; and "D" refers to "it depends".

TABLE 1

| PARAMETER | PROPERTY | C1 | C2 | C3 | C4 | C5 | C6 | C7 | C8 | C9 |
|---|---|---|---|---|---|---|---|---|---|---|
| SynchMode | Target Natural Synchronized | Y | N | Y | Y | N | N | N | Target | N |
| TargetLatency | msec | D | N | Y | Y | N | Y | N | 100 | N |
| AudioCodec | Mpeg UMC | Y | N | Y | Y | Y | N | N | Mpeg | N |
| AudioSource | None DirectSound File ASIO directKS waveRT | Y | N | Y | Y | N | N | N | DirectSound | Y |
| AudioSink | DirectSound ASIO directKS waveRT | Y | N | Y | Y | N | N | N | DirectSound | Y |
| AEC | true false | Y | N | Y | Y | N | Y | Y | true | Y |
| Adaptation Status | true false | Y | N | Y | Y | N | N | N | true | N |
| Suppression_Method | gain spectrum hybrid | Y | N | Y | Y | N | N | N | spectrum | N |
| Suppression_Level | none mild aggressive | Y | N | Y | Y | N | N | N | mild | N |
| Mute_Near_End | true false | Y | N | Y | Y | Y | N | Y | false | N |
| RX_Gain | | Y | N | Y | Y | N | N | Y | 1.0 | N |
| TX_Gain | | Y | N | Y | Y | N | N | N | 1.0 | N |
| MicGain | | Y | N | Y | Y | N | N | N | 1.0 | N |
| loadStateData | true false | N | N | Y | Y | N | N | N | false | N |
| loadStateFile_Name | path | N | N | Y | Y | N | N | N | ? | N |

TABLE 1-continued

| PARAMETER | PROPERTY | C1 | C2 | C3 | C4 | C5 | C6 | C7 | C8 | C9 |
|---|---|---|---|---|---|---|---|---|---|---|
| saveStateData | true false | N | N | Y | Y | N | N | N | N | N |
| saveStateFile_Name | path | N | Y | Y | Y | N | N | N | ? | N |
| gAudioVerbosity | true false | Y | Y | Y | Y | N | N | N | false | N |
| Calibration_Noise_STD | | Y | N | Y | Y | N | N | N | 0.02 | N |
| numMicrophones | 1-4 | Y | Y | Y | Y | N | Y | N | 1 | N |
| micsMixWeights | float | Y | Y | Y | Y | N | N | N | 1.0 | N |
| samplingRate | float 44100 48000 | Y | Y | Y | Y | Y | Y | N | 48000 | N |
| ASIO_Data_Size | 44100 144 288 576 1152 48000 160 320 640 1280 | Y | Y | Y | Y | N | Y | N | 640 | Y |
| Slide_Win_Size | 44100 144 288 576 1152 48000 160 320 640 1280 | Y | Y | Y | Y | N | Y | N | 320 | Y |
| History_Win_Size | 2-5 | Y | Y | Y | Y | N | Y | N | 4 | Y |
| AEC_Len | integer 6600, 14000 | Y | Y | Y | Y | N | Y | N | 6600 | Y |
| DC_Offset_Filter_Value | 0.9-0.999 | Y | Y | Y | Y | N | N | N | 0.99 | N |
| Delay_Block | integer | Y | Y | Y | Y | N | Y | N | 4 | D |
| Mu_Htil | float | Y | Y | Y | Y | N | N | N | 0.2 | N |
| Noise_Power | float | Y | Y | Y | Y | N | N | N | 0.000001 | N |
| NearEnd_Power | float | Y | Y | Y | Y | N | N | N | 0.00001 | N |
| FarEnd_Power | float | Y | Y | Y | Y | N | N | N | 0.00001 | N |
| DTD_Threshold | float | Y | Y | Y | Y | N | N | N | 0.00001 | N |
| BLK_Num_Decision | float | Y | Y | Y | Y | N | N | N | 10 | N |
| DTCohTime | integer | Y | Y | Y | Y | N | N | N | 25 | N |
| Lagrange | float | Y | Y | Y | Y | N | N | N | 0.00001 | N |
| Shadow_Estimate_Power_FAC | float | Y | Y | Y | Y | N | N | N | 0.99 | N |
| Room_Change_Decision_Lag | integer | Y | Y | Y | Y | N | N | N | 4 | N |
| Adapt_CNT_Init | integer | Y | Y | Y | Y | N | N | N | 400 | N |
| PFPDControl | float | Y | Y | Y | Y | N | N | N | 20 | N |
| scaleError_Spectrum | float | Y | Y | Y | Y | N | N | N | 0.2 | N |
| scaleHhat_Spectrum | float | Y | Y | Y | Y | N | N | N | 10 | N |

From Table 1, the SynchMode parameter defines the audio and video synchronization mode before driving the speakers. SynchMode is valid for audio modes such as DirectSound and DirectShow, but synchronization is not done for ASIO. With ASIO, the Nizza network receiver spits out the audio and video streams and hopes for the best. The SynchMode property is "target", "natural" or "synchronized". The "target" property matches a specified targeted latency and pushes audio out when the real latency is within 5% of the target latency. The "natural" property plays as soon as the AudioSink routine has a packet to process. The "synchronized" property synchronizes the video window with the audio output.

The TargetLatency parameter is the target latency of the audio output or speaker block. The target latency is not used for the ASIO driver and is only valid when SynchMode is set to Target. The AudioCodec and AudioCodecMode parameters define the codec mode for the audio decompressor connected to the network receiver for conferencing. The codec mode does not define the compression mode associated with the audio compressor block. The compression mode is always forced to Mpeg2. The decompression mode is defined by the participants. For conferencing, the audio codec can be reduced to a single parameter which is negotiated with each connection. In such case, a separate compressor and decompressor is used per connection.

The AudioSource parameter determines the interface for receiving an audio source. As an example, AudioSource may be selected as either "none", DirectSound, file, ASIO, directKS, or waveRT. "None" implies that no audio input will be enabled for conferencing. The "file" type is not specified as it will be interpreted when the file is opened. The AudioSink parameter determines what API to use when conferencing audio is output. As an example, AudioSink may be selected as DirectSound, ASIO, directKS, or waveRT.

The AEC parameter enables/disables the echo cancellation. For conferencing, echo cancellation is enabled only when ASIO is the audio interface. Further, echo cancellation may be disabled based on the audio interface or audio device. For example, if the user chooses a headphone for conferencing, echo cancellation may be disabled. When echo cancellation is disabled the user interface may block the user from adjusting other AEC parameters.

The Adaptation_Status parameter enables the echo cancellation circuit to update its filter parameters. If Adaptation_Status is disabled, then the shadow filter and main filters are not updated. In such case, echo cancellation may still be performed based on prefined or default values. The Suppression_Method parameter defines a method of reducing the residual echo and noise. The Suppression_Method property is "gain", "spectrum" or "hybrid" and is associated with a module that attempts to hide transition times of the echo canceller. In at least some embodiments, the suppression method is applied after the echo cancellation is added. The "gain" property reduces the overall signal strength of the audio input after the echo cancellation is removed. The gain is adjusted between a minimum and maximum gain level. The minimum gain is adjusted based on the suppression level. An aggressive suppression level causes the minimum gain to be low allowing more adjustment to the signal. The "spectrum" property compares the spectrum of the data after echo cancellation to the spectrum of the data coming from the network. In some embodiments, temporal averaging is applied during the spectrum estimation. The "hybrid" property applies an adjustment to the input signal after echo cancellation by: 1) applying an adjustment based on the spectrum; and 2) applying an adjustment based on gain. The input to this block from the network is delayed by the specified "Delay_Block" parameter.

The Suppression_Level parameter operates with a selected suppression method to determine how much to dampen the audio input in an attempt to hide errors in the echo cancellation. The Suppression_Level property may be "none", "mild" or "aggressive". The "none" property disables the suppression code such that the suppression method is irrelevant. The "mild" property attempts to minimally dampen the audio input when the echo control tries to adapt to changes in the room. The "aggressive" property makes more aggressive change to the audio input when the echo control tries to adapt to changes in the room. In stable environments, the "mild" and "aggressive" properties make no noticeable difference in the audio quality. However, in changing environments the "mild" property performs better than the "aggressive" property. Accordingly, the "mild" property is the default for the Suppression_Level parameter. The Mute_Near_End parameter mutes the local signal so that it is not sent to the remote systems. This feature is sometimes used during conferencing.

There are several gain parameters to control the audio pipeline for Overture conferencing. If the gains are larger than one; clipping can occur. The RX_Gain parameter is used for signals received from the remote system. For conferencing, an RX_Gain per connection is needed. The TX_Gain parameter is used for signals transmitted from the local system to all remote systems. When more than one system is connected there will still be only one TX_Gain parameter. The MicGain parameter is used to increase the microphone volume locally. There should be one microphone volume control for conferencing. MicGain is applied to the microphone signal after all microphone inputs are combined using the weighted micMixedWeights parameter mentioned below.

The loadStateData parameter tells Nizza whether to load the pre-calibrated impulse response and other state information. The loadStateData parameter is enabled based on the initial setup procedure. For example, if a calibration step is performed and a file is stored, then loading the state data may occur. If a calibration is not performed, then loading of state data makes does not occur. The loadStateFileName parameter is used to point to the pre-calibrated impulse response and other state information. Whether it is read is dependent on the loadStateData parameter mentioned above. The saveStateData parameter tells Nizza whether to save an impulse response file for initialization at the next startup. The saveStateFileName parameter is used to point to the location to store the precalibrated impulse response and other state information. Under normal usage it should match the location of the loadStateFileName.

Various diagnostic parameters are described herein. The gAudioVerbosity parameter is enabled to show echo control diagnostic information in a command window or log. The Calibration_Noise_STD parameter is a float value used to define the standard deviation of calibration noise. Exciting the system with noise that is uniform in the frequency spectrum allows for a richer excitation of the system and better echo cancellation parameters.

The numMicrophones parameter specifies the number of microphones in the system. For each microphone a pin is created on the ASIO driver which is then sent to the mixer. The mixer combines all inputs so that a single mono signal is sent to both the echo control and the remote systems. Any microphone gain specified is applied before the combination of inputs. If there is a single microphone gain, this gain is applied equally to all microphone inputs. The micsMixWeights parameter accumulates the microphone signals as defined for each microphone input. The micsMixWeights value determines the specific weighting to apply for the associated microphone. This weighting is applied before MicGain is applied.

The numLoadspeakers parameter defines the number of loadspeakers in Nizza with a maximum of 4. The selected value determines the number of output pins to define for ASIO. The samplingRate parameter is the audio sampling frequency. Additional sampling frequencies (in addition to 44100 and 48000) may be supported in Overture conferencing. If a participant joining a conference does not match the local sampling rate then either the sampling rate must change locally, or a re-sampling block needs to be inserted to take care of the new sampling frequency from the participant. The ASIO_Data_Size parameter is the default ASIO buffer size. This parameter is set, for example, based on negotiation with the hardware. The Slide_Win_Size parameter defines the number of samples to use when processing both the echo cancellation and the post processing suppression. The value of Slide_Win_Size is a divisor of ASIO_Buffer_Size and should be determined automatically during system initialization.

The History_Win_Size parameter is an integer number that defines the number of slide windows used as history in decision making. This value will affect performance. The history window size is set in light of the FFT sizes. The FFT sizes are in powers of two. The AEC_Len parameter is an integer value that defines the length of the adaptive filter. The DC_Offset_Filter_Value parameter determines the value for DC offset removal filter. Nizza currently defines a minimum value of 0.8 and a maximum value of 0.9999 for this value. The DC_Offset_Filter_Value removes the dc offset from both the packets coming in from the network and the packets from the microphone. The Delay_Block parameter defines an integer compensation value for the delay introduced in Nizza in the near-end loop. The data from the network used in the echo control is delayed by the value of Delay_Block to compensate for the hardware delay (audio out=>audio in).

Various parameters set the initial state for echo cancellation. The Mu_Htil parameter defines the adaptation step size and affects the accuracy and speed of convergence. Nizza defines a range 0.01 to 0.99 for Mu_Htil. The Noise_Power parameter is a float value for the initial background noise power. Nizza defines a range of 0.001 to 0.000001 for Noise_Power. The NearEnd_Power parameter is a float value for the initial signal power. Nizza defines a range of 0.01 to 0.00001 for NearEnd_Power. The FarEnd_Power is a float value for the far-end signal power. Nizza defines a range of 0.01 to 0.0001 for FarEnd_Power. The DTD_Threshold parameter is a float value for the initial double-talk detection threshold. The BLK_Num_Decision parameter is an integer value that defines the number of blocks of Slide_Win_Size used to make a decision about double-talk. As BLK_Num_Decision increases in value, there is more delay and potential accuracy in determining double-talk. "Double-talk" refers to when both local and remote participants are talking. During double-talk, the shadow filter and main filters cannot be updated. The DTCohTime parameter is an integer value that defines the number of blocks of Slide_Win_Size used for hysteresis of the double-talk state. The Slide_Win_Size value is selected to prevent the AEC algorithm from switching in and out of the double-talk state too quickly.

The Lagrange parameter is a float value for the nominal value for a lagrange multiplier in suboptimal optimization. This parameter sacrifices accuracy for stability and is used to stabilize the behavior of the AEC algorithm. Nizza defines a range of 0.00001 to 1.0 for Lagrange. The Shadow_Estimate_Power_FAC parameter is a float value for averaging in spectrum estimation and affects how agile the shadow is. Shadow_Estimate_Power_FAC also affects double-talk detection and hence the convergence. The Room_Change_Decision_Lag parameter is an integer value defining the number of blocks used as a lag in making decisions about room change. As the Room_Change_Decision_Lag value increases, the echo canceller takes longer to determine that a room has changed. This prevents the AEC algorithm from declaring a room change unless it is noticeable. The Adapt_CNT_Init parameter is a positive integer value used in adaptive tracking of the room impulse response. The Adapt_CNT_Init value controls how fast the AEC algorithm needs to react to a room change.

The PFPDControl parameter is a float value used in controlling the probably of false alarms versus probability of detection. As the PFPFControl value increases, the AEC algorithm is more sensitive to declare double-talk. Also, as the PFPFControl value increases, NLP would be less aggressive and the echo might be heard more often. The scaleErrorSpectrum parameter is a float value for scaling the error spectrum in the preconditioning matrix. The Nizza software takes a ratio of the maximum power from the network with the maximum power from the microphone and scales it by the scaleErrorSpectrum value. The scaled value is used to define the error spectrum and affects stability of echo cancellation. The scaleHhatSpectrum parameter is a float value for scaling the average that spectrum in the preconditioning matrix.

In accordance with at least some embodiments, at least some of the Overture parameters described above are varied for different CETs selectable based on user input. Without limitation to other embodiments, CETs selection may affect an AEC suppression method parameter (e.g., "Suppression_Method"), an AEC suppression level parameter (e.g., "Suppression_Level"), an AEC rate of adaptation parameter (e.g., "samplingRate"), AEC estimation filter size parameters (e.g., "AEC_Len", "ASIO_data_size", and "history_win_size"), and sensitivity to double-talk parameters (e.g., "slide_win_size", "BLK_Num_Decision", and "delay block"). As a specific example, for a sampling frequency of 4 KHz, the AEC_Len value may be 7000 for CET of a cubicle or a conference room with sound treatment. However, for the CET of a conference room (size 10 ft*12 ft*18 ft) without sound treatment, the AEC_Len value may be about 12000 to 15000.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor;
   a network interface coupled to the processor; and
   a system memory coupled to the processor, the system memory storing a communication application having a conferencing user interface,
   wherein the conferencing user interface, when executed, enables a user to set up a peer-to-peer conferencing session by selecting one of a plurality of conferencing environment templates (CETs),
   wherein each of the plurality of CETs is matched to one of a plurality of different sets of acoustic echo cancellation (AEC) parameters to be statically applied during the conferencing session.

2. The computer system of claim 1 wherein the plurality of CETs comprise an office room template, a conference room template, and an auditorium template.

3. The computer system of claim 1 wherein the AEC parameters comprise an echo suppression method parameter and an echo suppression level parameter.

4. The computer system of claim 1 wherein the AEC parameters comprise an estimation filter size parameter, an adaptation rate parameter, and a double-talk sensitivity parameter.

5. The computer system of claim 1 wherein the plurality of CETs are categorized by room size.

6. The computer system of claim 1 wherein the plurality of CETs are categorized by room shape.

7. The computer system of claim 1 wherein the plurality of CETs are categorized by speaker location and microphone location within a room.

8. The computer system of claim 1 wherein at least some AEC parameters associated with the CETs are not visible to a conference participant.

9. The computer system of claim 1 wherein some AEC parameters are not associated with any CETs.

10. A non-transitory computer-readable storage medium storing a communication application that, when executed, causes a processor to:
    select one of a plurality of conferencing environment templates (CETs) based on user input; and
    provide a peer-to-peer conferencing session based on acoustic echo cancellation (AEC) parameters corresponding to the selected CET and applied statically during the peer-to-peer conferencing session.

11. The non-transitory computer-readable storage medium of claim 10 wherein the communication application, when executed, causes the processor to select between an office room CET, a conference room CET, and an auditorium CET based on user input.

12. The non-transitory computer-readable storage medium of claim 10 wherein the communication application, when executed, causes the processor to select one of the plurality of conferencing environment templates based on room size input, room shape input, speaker location input, and microphone location input.

13. The non-transitory computer-readable storage medium of claim 10 wherein the communication application, when executed, causes the processor to implement AEC based on an echo suppression method parameter and an echo suppression level parameter that selectively vary for different CETs.

14. The non-transitory computer-readable medium of claim 10 wherein the communication application, when executed, causes the processor to implement AEC based on an estimation filter size parameter, an adaptation rate parameter, and a double-talk sensitivity parameter that selectively vary for different CETs.

15. A method for a communication application, comprising:
    selecting, by a processor, one of a plurality of conferencing environment templates (CETs) based on user input; and
    providing, by the processor, a peer-to-peer conferencing session based on acoustic echo cancellation (AEC) parameters corresponding to the selected CET and applied statically during the peer-to-peer conferencing session.

16. The method of claim 15 wherein selecting one of the plurality of CETs based on user input comprises selecting between an office room template, a conference room template, and an auditorium template based on user input.

17. The method of claim 15 wherein selecting one of the plurality of conferencing environment templates based on user input comprises selecting a template based on room size input, room shape input, speaker location input, and microphone location input.

18. The method of claim 15 further comprising selectively varying an AEC suppression technique parameter and an AEC suppression level parameter based on CET selection.

19. The method of claim 15 further comprising selectively varying an AEC estimation filter size parameter, an AEC adaptation rate parameter, and an AEC double-talk sensitivity parameter based on CET selection.

20. The method of claim 15 further comprising preventing at least some AEC parameters associated with the CETs from being viewed by conference participants.

* * * * *

UNITED STATES PATENT AND TRADEMARK OFFICE
CERTIFICATE OF CORRECTION

PATENT NO. : 9,538,299 B2
APPLICATION NO. : 12/606930
DATED : January 3, 2017
INVENTOR(S) : Byron A. Alcorn et al.

It is certified that error appears in the above-identified patent and that said Letters Patent is hereby corrected as shown below:

In the Claims

In Column 17, Line 13 approx., in Claim 14, delete "computer-readable medium" and insert -- computer-readable storage medium --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*